(12) United States Patent
Noda

(10) Patent No.: US 10,836,004 B2
(45) Date of Patent: Nov. 17, 2020

(54) METHOD OF MANUFACTURING AND MANUFACTURING APPARATUS FOR A RING MEMBER ATTACHED PRODUCT

(71) Applicant: HIRATA CORPORATION, Kumamoto (JP)

(72) Inventor: Mitsuhiro Noda, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 213 days.

(21) Appl. No.: 15/985,787

(22) Filed: May 22, 2018

(65) Prior Publication Data

US 2018/0339379 A1 Nov. 29, 2018

(30) Foreign Application Priority Data

May 23, 2017 (JP) ................................ 2017-102185

(51) Int. Cl.
*B23P 19/08* (2006.01)
*B25B 27/14* (2006.01)
(Continued)

(52) U.S. Cl.
CPC ........ *B23P 19/084* (2013.01); *B25B 27/0028* (2013.01); *B25B 27/14* (2013.01);
(Continued)

(58) Field of Classification Search
CPC .... B23P 19/084; B23P 19/088; Y10T 29/536; Y10T 29/5363; Y10T 29/4987; Y10T 29/49876; B25B 27/0028; B25B 27/14; B25B 27/20; B25B 27/12; B25J 15/0028; B25J 15/0033; B25J 15/0095; B25J 15/10
See application file for complete search history.

(56) References Cited

U.S. PATENT DOCUMENTS 5,303,465 A * 4/1994 Fujimoto ............... B23P 19/088
29/222
5,588,208 A * 12/1996 Sato ...................... B23P 19/088
29/222
(Continued)

FOREIGN PATENT DOCUMENTS

| JP | 63260731 A | * 10/1988 | ............ B23P 19/088 |
| JP | 2009-115170 A | 5/2009 | |
| JP | 2016-049597 A | 4/2016 | |

OTHER PUBLICATIONS

Translation of JP-63260731-A (Year: 1988).*

*Primary Examiner* — Matthew P Travers
(74) *Attorney, Agent, or Firm* — Buchanan Ingersoll & Rooney PC

(57) ABSTRACT

A method of manufacturing a component and a component manufacturing apparatus to attach an attached part in a predetermined posture to a ring-shaped channel formed in an outer circumference of a component main body. While being held by holding portions, a ring-shaped seal body is placed in contact with a tapered portion and has its diameter expanded to at least the outer diameter of the component main body. The seal body elastically deforms from the expanded-diameter state so that its diameter reduces and is attached to the attachment channel in the outer circumferential surface of the component main body while being guided by the holding portions.

4 Claims, 10 Drawing Sheets

(51) Int. Cl.
*B25B 27/00* (2006.01)
*B25J 15/10* (2006.01)
*B25J 15/02* (2006.01)
*B25J 15/00* (2006.01)

(52) U.S. Cl.
CPC .......... *B25J 15/0206* (2013.01); *B25J 15/10* (2013.01); *B23P 19/088* (2013.01); *B25J 15/0095* (2013.01)

(56) References Cited

U.S. PATENT DOCUMENTS

| | | | |
|---|---|---|---|
| 2006/0123610 A1* | 6/2006 | Haratake | B23P 19/088 29/222 |
| 2007/0124920 A1* | 6/2007 | Kim | B23P 19/9084 29/709 |
| 2007/0271753 A1* | 11/2007 | Haag | B23B 31/16241 29/235 |
| 2015/0360335 A1* | 12/2015 | Jones | B23P 19/088 29/888.044 |
| 2017/0305017 A1 | 10/2017 | Takebayashi et al. | |
| 2018/0281130 A1* | 10/2018 | Yasue | B23P 19/084 |

\* cited by examiner

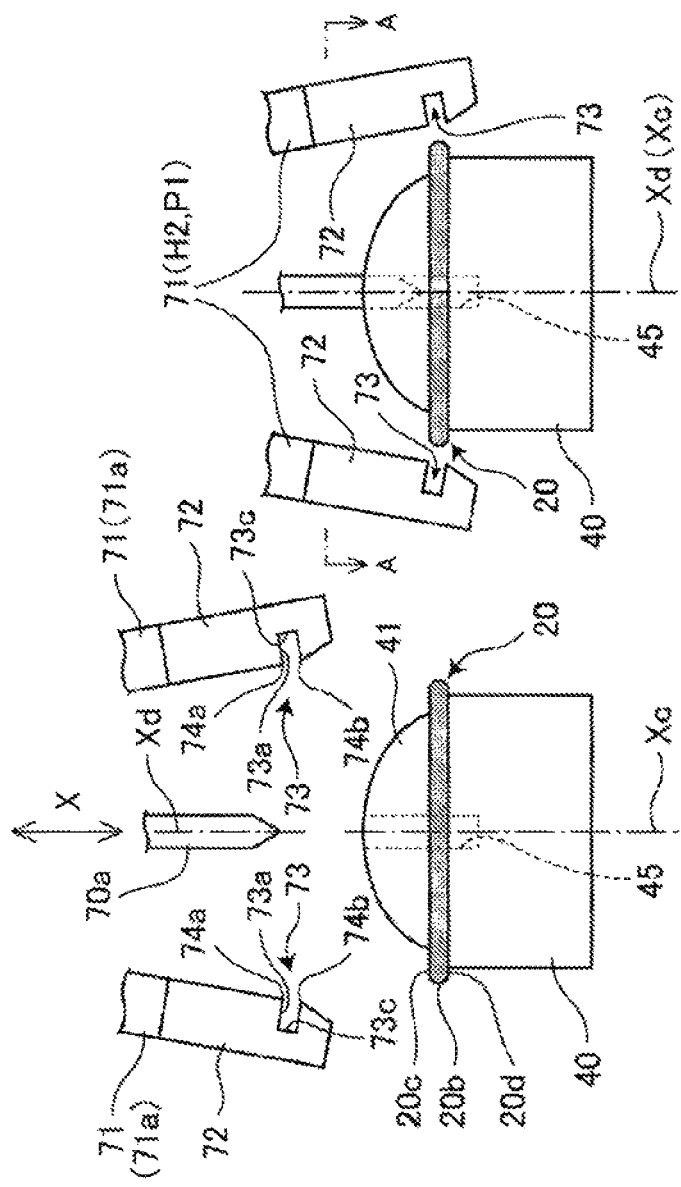

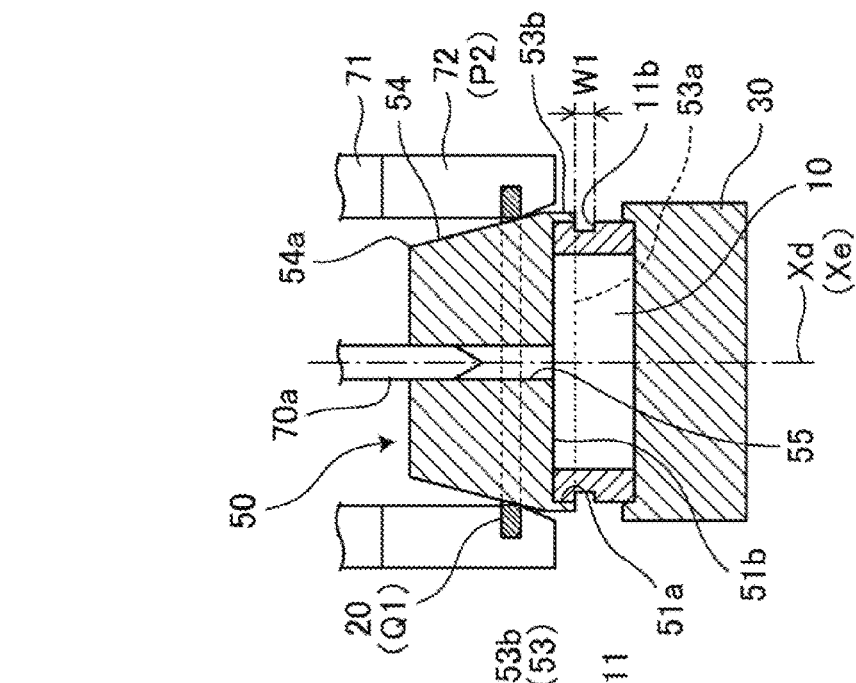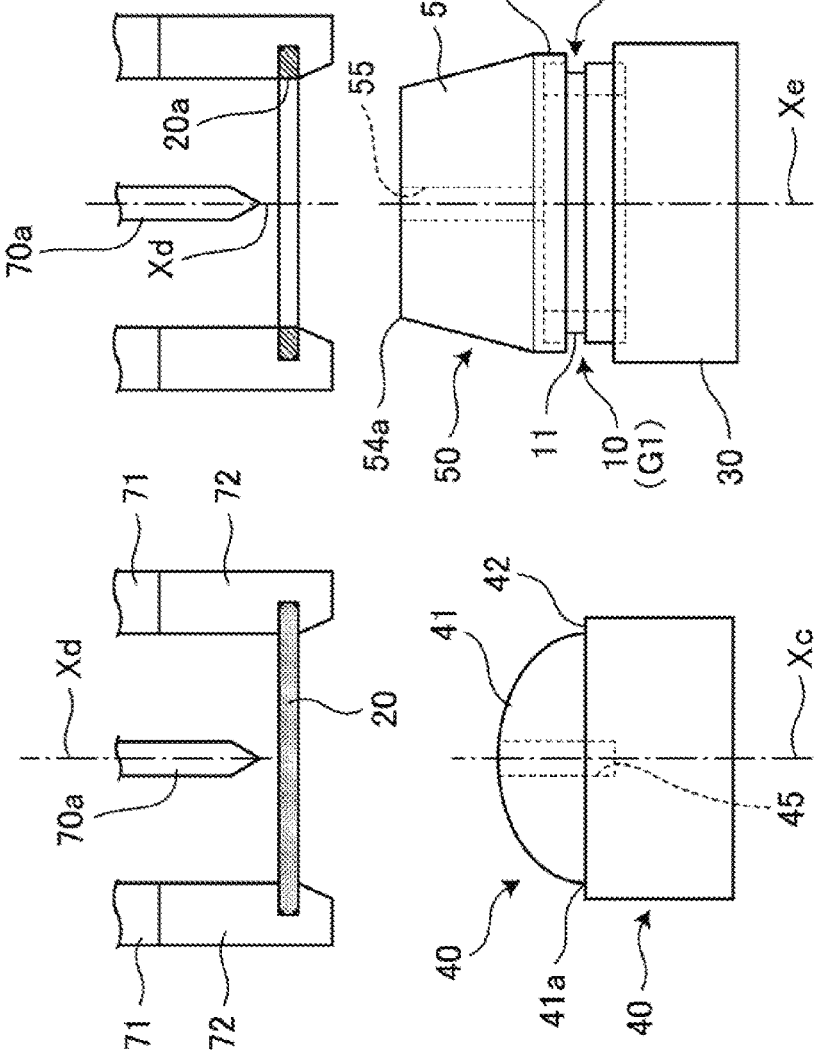

METHOD OF MANUFACTURING AND MANUFACTURING APPARATUS FOR A RING MEMBER ATTACHED PRODUCT

FIELD OF THE INVENTION

The present invention relates to a method of manufacturing and a manufacturing apparatus for an assembled product (ring member attached product) that has an attached part attached to a component main body.

BACKGROUND ART

An industrial robot that attaches an O ring is known as one example of an apparatus that attaches an elastic ring-shaped attached part to a ring-shaped channel formed in the outer circumferential surface of a component main body (see Patent Literature 1).

With this robot, an O ring is pressed downward along a tapered surface by a lower end of a second clamping member 12 and the O ring finally fits into an O ring channel 17 formed in a side circumferential surface of an assembled component 16 (see FIG. 12C of Patent Literature 1).

A snap ring attachment apparatus that attaches a snap ring to a snap ring attachment channel formed in a ring-shaped outer circumferential surface is also known (see Patent Literature 2).

With this attachment apparatus, a snap ring 8 is pressed downward by a ring plate member 22 that is pressed downward by a lower end surface 1420A of a cylindrical portion 1420, and after being pressed downward and coming off the lower end of a cylindrical surface portion 28, the snap ring 8 elastically deforms so that its diameter reduces and becomes attached to a snap ring attachment channel 82 (see FIGS. 3 to 5 in Patent Literature 2).

CITATION LIST

Patent Literature

[Patent Document 1]
Japanese Laid-open Patent Publication No. 2016-049597
[Patent Document 2]
Japanese Laid-open Patent Publication No. 2009-115170

SUMMARY OF THE INVENTION

Since the O ring attached by the industrial robot described above is a component with a circular cross-sectional form, it does not matter which part of the O ring appears outside the attachment channel after the attachment process.

Also, since the snap ring that is attached by the attachment apparatus described above is a component with a rectangular cross-sectional form manufactured using a material such as steel, when pressed downward by the ring-plate member 22, so-called "inversion", where the snap ring becomes inside out, will not occur.

However, with a seal body that is made of an elastic material and has an asymmetrical cross section, there will be a correct orientation in which the seal body is to be attached, which makes it important to always attach the seal with the correct posture and avoid "inversion (i.e., turning inside out)" of the seal body described above. A seal body that is not in the correct posture, or in another words, a seal body that has been attached in an inverted state corresponds to an attachment error and is incapable of achieving the desired sealing performance, which makes reattachment necessary.

The present invention was conceived in view of the problem described above and has an object of providing a component manufacturing apparatus and a method of manufacturing a component that attach an attached part with a predetermined posture that is decided in advance when attaching a ring-shaped attached part to a ring-shaped channel formed in the outer circumference of a component main body.

According to an aspect of the present invention, there is provided a method of manufacturing an assembled product that has a ring-shaped seal body attached to a ring-shaped attachment channel formed in an outer circumferential surface of a component main body, the method including: a supplying step that supplies a seal body to a guide member that has been detachably mounted on the component main body; a moving step that moves the seal body from a supplying position on the guide member to a position that faces the attachment channel; and an attachment step that guides the seal member that has moved to the facing position into the attachment channel, wherein the ring-shaped seal body is capable of elastic deformation and is provided with a ring-shaped inner circumferential portion, a first facing surface that faces a first inner wall out of a pair of inner walls of the attachment channel when the seal body is attached to the attachment channel, and a second facing surface that faces a second inner wall out of the pair of inner walls, the guide member includes a large diameter portion, which is positioned on the attachment channel side when the guide member is mounted on the component main body, and a tapered portion, which is continuous with the large diameter portion and is tapered, and the guide member is positioned so that an axis of the tapered portion matches an axis of the component main body, the supplying step fits the ring-shaped inner circumferential portion of the ring-shaped seal portion onto the tapered portion of the guide member, the moving step moves the seal body toward the attachment channel with the inner circumferential portion of the seal body in contact with the tapered portion to expand an inner diameter of the ring-shaped inner circumferential portion to an outer diameter of the outer circumferential surface or larger, and when the ring-shaped seal body at the facing position is attached to the attachment channel, the attachment step guides attachment to the attachment channel while guiding the ring-shaped seal body that deforms from an expanded state to a reduced diameter due to elastic deformation.

The supplying step should preferably include a positioning step that aligns positions of a center of the component main body and a center position of the seal body.

The moving step should preferably hold at least part of a circumferential end surface and a circumferential edge portion of the seal body supplied to the tapered portion using a holding unit, and expand a diameter of the seal body held by the holding unit by moving the seal body along the tapered portion toward the attachment channel in a state where holding of the seal body is maintained, and the attachment step should preferably move the seal body from a position contacting the large diameter portion to the facing position in a state where the holding of the seal body by the holding unit is maintained and, when a pressing force that acts outwardly in a radial direction of the seal body due to the large diameter portion is released so that a diameter of the seal body reduces due to elastic deformation, guide the seal body into the attachment channel in a state where the holding of the seal body by the holding unit is maintained.

The holding unit should preferably be equipped with a plurality of holding plates equipped with holding portions that hold a circumferential end surface and a circumferential edge portion of the seal body, each holding plate should preferably be capable of moving outward and inward in a radial direction of the seal body and also be capable of moving toward an axis of the tapered portion, and the attachment step should preferably attach the seal body, which has been moved in the moving step while the diameter expands and the seal body is guided by the guide portion, to the attachment channel.

It is also preferable for each holding plate to be capable of moving to a holding position where the seal body is held by the holding portion and to a withdrawal position where the holding plate has been moved outward from the holding position in the radial direction of the seal body and is separated from the seal body, and preferable for the method to include a conveying step that moves the plurality of holding plates from the withdrawal positions to the holding positions to hold the ring-shaped seal body, which is to be attached and has been moved to a predetermined position, using the plurality of holding plates in a conveyable state, and conveys the held seal body to a standby position above the tapered portion.

Another aspect of the present invention is a manufacturing apparatus that manufactures an assembled product that has a ring-shaped seal body attached to a ring-shaped attachment channel formed in an outer circumferential surface of a component main body, has a first facing surface that faces a first inner wall out of a pair of inner walls of the attachment channel, and has a second facing surface that faces a second inner wall out of the pair of inner walls of the attachment channel, the manufacturing apparatus including: a guide member that is detachably mounted on the component main body; and a holding unit that moves a seal body that has been supplied to the guide member from a supplying position to a position facing the attachment channel of the component main body and guides the seal body into the attachment channel, wherein the guide member includes a guide portion that is contacted by an inner circumferential portion of the seal body supplied to the guide member mounted on the component main body, the guide portion includes a large diameter portion positioned on the attachment channel side and a tapered portion which is continuous with the large diameter portion and is tapered, the guide member is mounted with a center axis of the tapered portion aligned with an axis of the component main body, and the holding unit is equipped with holding plates that include a first surface capable of being disposed facing the first facing surface of the seal body that has been supplied to the guide member and a second surface capable of being disposed facing the second facing surface of the seal body in a state where the first surface faces the first facing surface.

The holding unit should preferably include an axis guiding member that is guided into a center hole formed in a center of the guide member.

The holding unit should preferably be equipped with a plurality of holding plates and a swinging support portion that supports the plurality of holding plates so as to be capable of swinging in a radial direction, and the swinging support portion should preferably support the holding plates in a state where a biasing force is applied inwardly in the radial direction.

The manufacturing apparatus should also preferably further include: a holding plate moving unit that swings the holding plates between a holding position where the seal body is held and a withdrawal position where the holding plates are outside the holding position in the radial direction of the seal body and are separated from the seal body; and a moving mechanism that moves the holding unit that holds the ring-shaped seal body before attachment toward the guide member that has been mounted on the component main body.

According to the method of manufacturing and the manufacturing apparatus according to the present invention, it is possible to reliably attach an attached part with a predetermined posture when attaching a ring-shaped attached part to a ring-shaped channel formed in the outer circumferential surface of a component main body.

BRIEF DESCRIPTION OF DRAWINGS

FIGS. 4A and 4B are diagrams (front views) useful in explaining the operation of the manufacturing apparatus and a method of manufacturing the assembled product, and FIG. 4C is a cross-sectional view for explanatory purposes;

FIGS. 6A to 6C are diagrams useful in explaining the operation of the manufacturing apparatus and the method of manufacturing an assembled product;

REFERENCE SIGNS

Figure 1A:
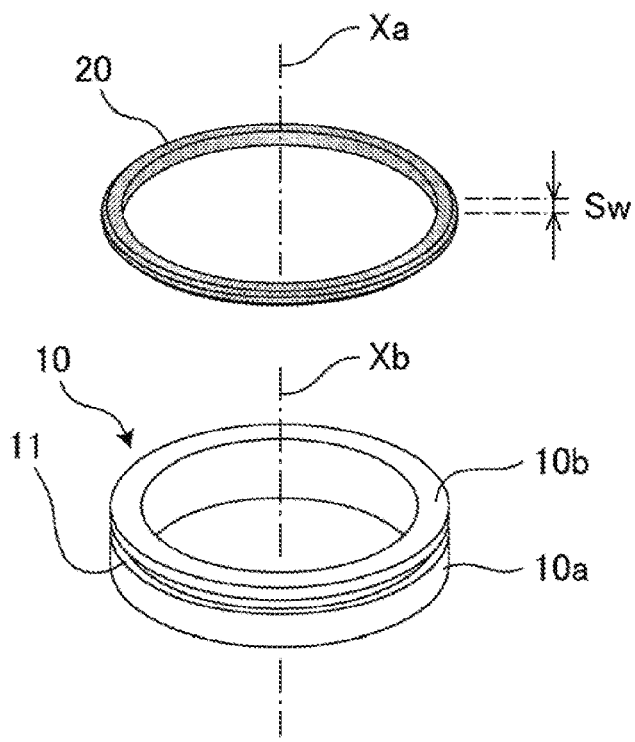
FIG. 1A is an exploded perspective view of an assembled product to be manufactured.

1 . . . manufacturing apparatus
10 . . . component main body
10a . . . outer circumferential surface
11 . . . attachment channel (or "ring-shaped channel")
11a . . . one inner wall (or "first inner wall")
11b . . . another inner wall (or "second inner wall")
11c . . . inner circumferential wall (or "third inner wall")
20 . . . seal body (or "attached product")
20a . . . inner circumferential surface (or "inner circumferential portion")
20b . . . outer circumferential surface (or "outer circumferential portion")
20c . . . upper surface (or "first facing surface"),
20d . . . lower surface (or "second facing surface")
20z . . . axis
30 . . . holding table (or "component table" or "component main body attachment unit")
40 . . . loading member
41 . . . convex portion 41a . . . outer circumferential edge of convex portion (inner circumferential edge of loading surface)
42 . . . loading surface
45 . . . guide hole
50 . . . guide member
51 . . . attachment portion
51a . . . radial direction positioning surface
51b . . . up-down direction positioning surface
52 . . . guide portion
53 . . . large diameter portion
53a . . . lower end surface of large diameter portion
53b . . . outer circumferential surface of large diameter portion
54 . . . tapered portion
54a . . . small diameter portion
55 . . . guide hole
60 . . . holding unit
70 . . . holding unit main body
70a . . . axis guiding member
71 . . . arm
71a . . . first arm portion
71b . . . second arm portion
71c . . . swinging shaft
72 . . . holding plate
72a . . . curved surface
73 . . . holding portion
73a . . . pressing surface (or "first surface")
73b . . . support surface (or "second surface")
73c . . . outer facing surface
74a . . . circumferential edge portion of pressing surface
74b . . . circumferential edge portion of support surface
79 . . . support portion (or "swinging support portion")
82 . . . moving unit (or "holding plate moving unit" or "swinging mechanism")
82a . . . swinging cylinder
82b . . . up-down moving portion
82c . . . spring (or "biasing member")
90 . . . conveying mechanism
91 . . . horizontal moving mechanism
91a . . . guide rail
91b . . . slider
92 . . . raising/lowering mechanism (or "raising/lowering unit")
92a . . . raising/lowering portion
A . . . assembled product (ring member attached product)
C . . . disposed circle
F1 . . . biasing force of spring
G1 . . . attachment position of guide member on component main body
H1 . . . raised position
H2 . . . preparation position
P1 . . . withdrawal position
P2 . . . first holding position
P3 . . . second holding position
Q1 . . . supplying position
Q2 . . . first movement position (or "large diameter position")
Q3 . . . facing position
Sw . . . thickness of seal body
W1 . . . gap between lower end surface of large diameter portion and lower surface of attachment channel
W2 . . . separation distance
W3 . . . width in radial direction of lower surface 20d of seal body
X . . . up-down direction
X1 . . . upward
Xa . . . center axis of seal body
Xb . . . center axis of component main body
Xc . . . center axis of loading member
Xd . . . center axis of holding unit
Xe . . . center axis of guide member
Y . . . horizontal direction
Ya . . . radial direction

DESCRIPTION OF THE PREFERRED EMBODIMENTS

Next, preferred embodiments of a manufacturing apparatus for a ring member attached product (a manufacturing apparatus for an assembled product) and a method of manufacturing according to the present invention will now be described with reference to the attached drawings.

The manufacturing apparatus for a ring member attached product (hereinafter simply "manufacturing apparatus") and method of manufacturing for an assembled product (ring member attached product) according to the present embodiment relate to manufacturing of an assembled product A depicted in FIGS. 1A to 1C. The assembled product A is constructed of a component main body 10, which is cylindrical, and a seal body (or "attached part") A, which is ring-shaped. According to the present manufacturing apparatus and method of manufacturing, the assembled product A is manufactured by attaching the ring-shaped seal body 20 to a ring-shaped channel (or "attachment channel") 11 formed in an outer circumferential surface 10a of the cylindrical component main body 10.

Although the manufacturing apparatus according to the present embodiment is capable of attaching a variety of seal bodies 20 to a variety of component main bodies 10, an example where a ring-shaped seal body 20 that is flexible (that is, a ring-shaped rubber member) is attached to a component main body 10 made of steel will be described here.

Figure 1B:
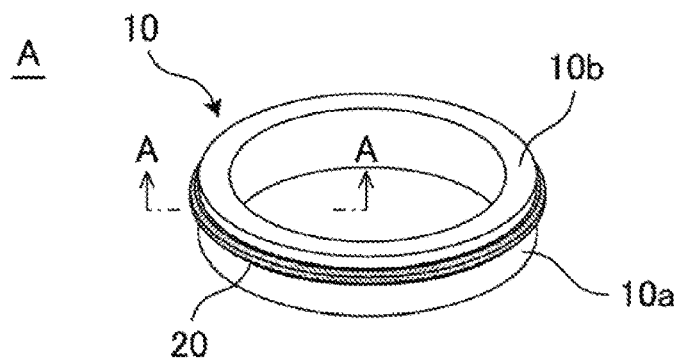
FIG. 1B is a perspective view of the assembled product to be manufactured.

As depicted in FIG. 1A, the component main body 10 is equipped with the attachment channel (or simply "channel") 11 that is formed in the ring-shaped outer circumferential surface 10a.

Figure 1C:
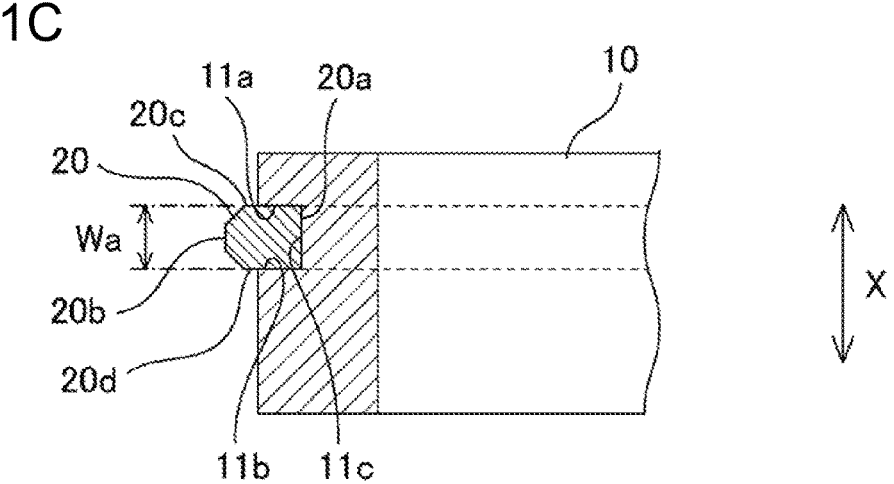
FIG. 1C is a cross-sectional view depicting an A-A section in FIG. 1B.

As depicted in FIG. 1C, the attachment channel 11 includes a pair of inner walls (or a "first inner wall" and a "second inner wall") 11a and 11b that are disposed facing each other adjacent to an opening of the channel and an inner circumferential wall (or "third inner wall") 11c positioned between the pair of inner walls 11a and 11b, and is formed with a U-shaped cross section (i.e., a rectangular shape where one side is open). One inner wall (the first inner wall) 11a out of the pair of inner walls is disposed at an upper position in an up-down direction X of the attachment channel 11 and the other inner wall (the second inner wall) 11b is disposed at a lower position in the up-down direction X.

The seal body 20 has an inner circumferential surface (or "inner circumferential portion") 20a, an outer circumferential surface (or "outer circumferential portion" 20b, an upper surface (or "first facing surface") 20c, and a lower surface ("second facing surface") 20d.

The inner circumferential surface 20a and the outer circumferential surface 20b of the seal body 20 are positioned on circles that are concentric with a center axis Xa (see FIG. 1A) of the ring-shaped seal body 20, and the upper surface 20c and the lower surface 20d are surfaces that intersect (in the present embodiment, surfaces that are perpendicular to) the center axis Xa. That is, the inner circumferential surface 20a is a surface that is perpendicular to the upper surface 20c and the lower surface 20d of the seal body and is formed so as to be continuous with the seal body upper surface 20c and the seal body lower surface 20d.

The seal body 20 is also provided with an inclined surface (produced by trimming the corner) between the outer circumferential surface 20b and the upper surface 20c and is provided in the same way with an inclined surface (produced by trimming the corner) between the outer circumferential surface 20b and the lower surface 20d. That is, the seal body 20 is a ring-shaped component whose cross-section is in the form of an asymmetric hexagon and has an outer circumferential portion that tapers toward the outer circumferential edge.

The seal body 20 is attached to the component main body 10 in the following state. In more detail, the inner circumferential surface 20a of a seal body 20 that has been attached contacts the inner circumferential wall (or "third wall") 11c of the component main body 10. The upper surface 20c of the seal body 20 contacts the first inner wall 11a at the top of the attachment channel 11 and the lower surface 20d of the seal body 20 contacts the second inner wall 11b at the bottom of the attachment channel 11.

Figure 2:
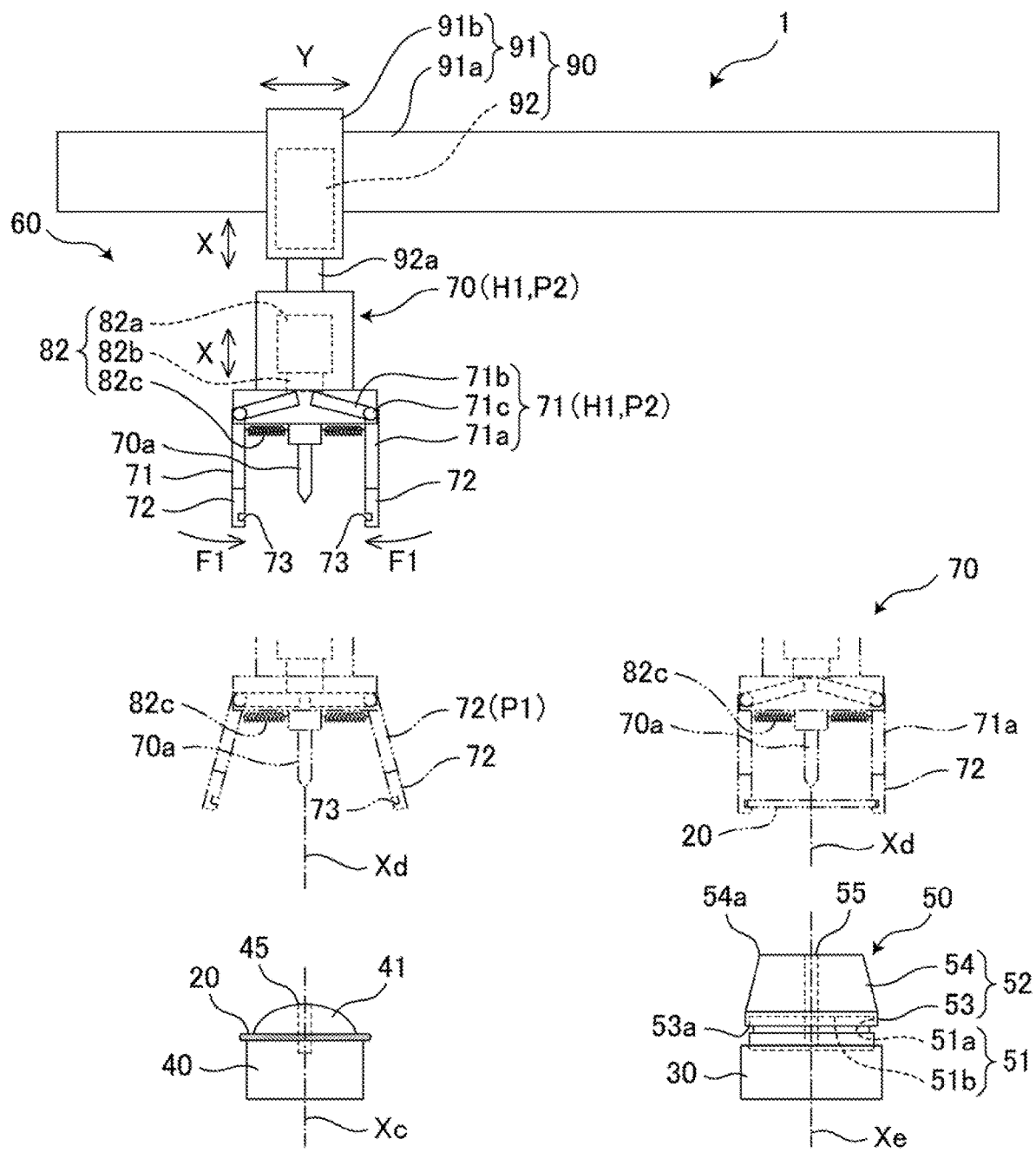
FIG. 2 is a schematic view depicting the configuration of a manufacturing apparatus according to an embodiment of the present invention.

As depicted in FIG. 2, a manufacturing apparatus 1 includes a holding table (or "component table") 30 that holds a component main body 10, a guide member 50 that is detachably mounted on the component main body 10 that has been placed on the holding table 30, and a holding unit 60 that is used when attaching the seal body 20 to the component main body 10 on which the guide member has been mounted. The manufacturing apparatus 1 further includes a loading member 40 on which the ring-shaped seal body 20 is loaded before attachment to the component main body 10.

The holding unit 60 is disposed above the installed positions of the holding table 30 and the loading member 40, and is equipped with holding plates 72, described later, that are used to hold the seal body 20 to be attached, a holding unit main body 70 to which the holding plates 72 are attached, a moving unit 82 that moves the holding plates 72, described later, of the holding unit main body 70, and a conveying mechanism 90 that moves the holding unit main body 70.

The conveying mechanism 90 is equipped with a horizontal moving mechanism 91 that moves the holding unit main body 70 horizontally and a raising/lowering mechanism 92 that raises and lowers the holding unit main body 70 in the up-down direction X.

The horizontal moving mechanism 91 is equipped with a guide rail 91a that extends horizontally and a slider 91b that is capable of moving horizontally along the guide rail 91a.

The raising/lowering mechanism 92 is installed on the slider 91b and has a raising/lowering portion 92a on which the holding unit main body 70 is installed.

Note that since the horizontal moving mechanism 91 is a known moving mechanism (as examples, a screw driving mechanism, which is equipped with a ball nut and a ball screw, or a belt driving mechanism that causes movement by reciprocally driving a belt), detailed description thereof is omitted here. Since the raising/lowering mechanism 92 is also a known moving mechanism (such as a screw driving mechanism, which is equipped with a ball nut and a ball screw), detailed description thereof is omitted here.

Also, although two mechanisms, the horizontal moving mechanism 91 and the raising/lowering mechanism 92, that are perpendicular to each other are used as the conveying mechanism in the present embodiment, it is also possible to use an articulated moving mechanism where the horizontal moving mechanism 91 and the raising/lowering mechanism 92 are replaced by an articulated arm.

As one example, when the seal body 20 placed on the loading member 40 is to be held by the holding unit 60, the raising/lowering mechanism 92 is operated in a state where the holding unit main body 70 has been positioned above the loading member 40 to raise and lower the holding unit main body 70 (see FIG. 2).

After this, when a seal body 20 held by the holding unit 60 is to be moved above a component main body 10 prepared on the holding table 30, the raising/lowering mechanism 92 is first operated, the holding unit main body 70 is moved to a position above the loading member 40, and then the horizontal moving mechanism 91 is operated to move the holding unit main body 70 from the position above the holding unit 60 to a position above the holding table 30 (see FIG. 2).

Also, when the seal body 20 held by the holding unit 60 is to be attached to the component main body 10 (see FIG. 7A and FIG. 7B), the raising/lowering mechanism 92 is operated to raise and lower the holding unit main body 70 holding the holding unit main body 70 (see FIG. 2).

Figure 3:
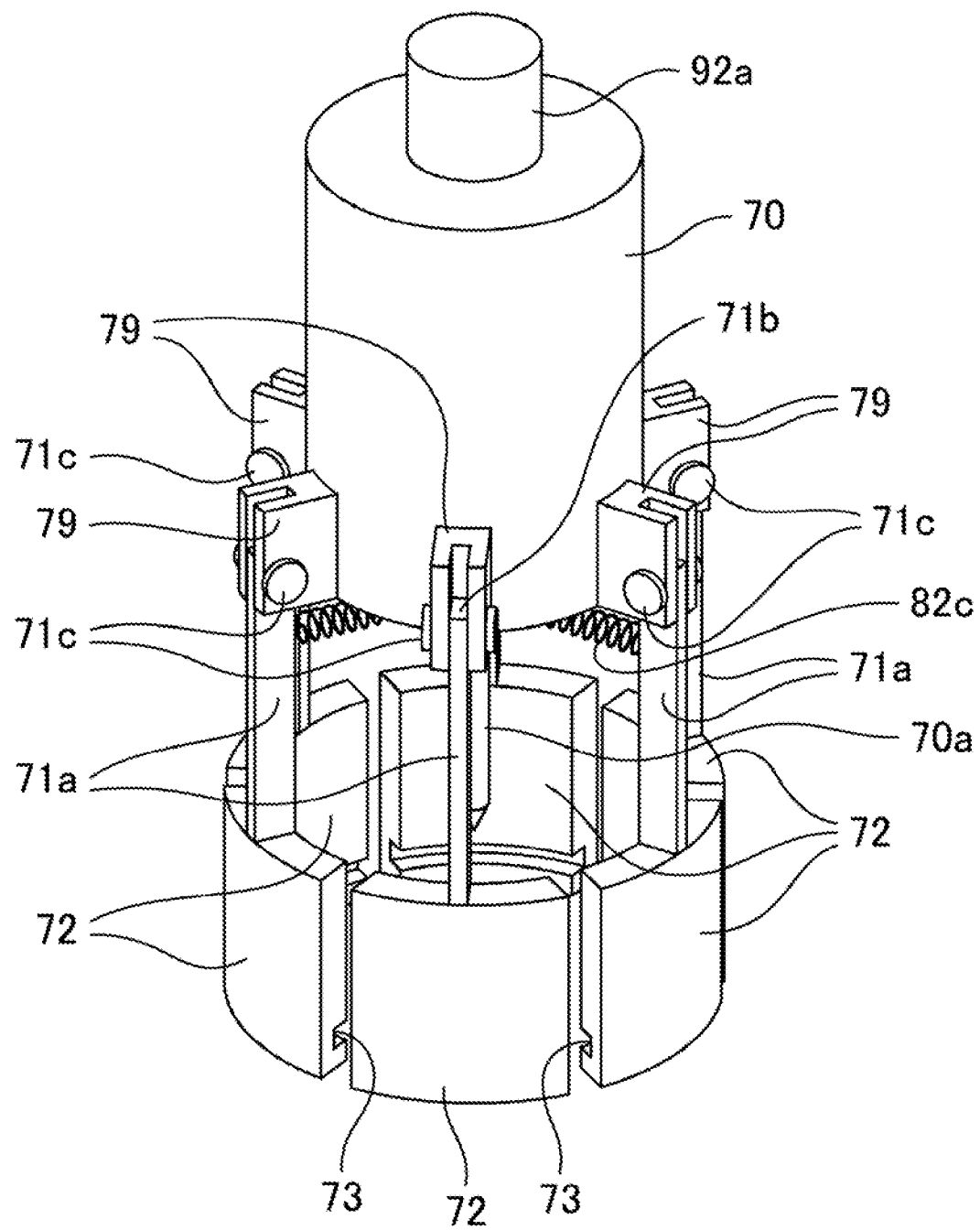
FIG. 3 is a perspective view useful in explaining a principal part of a holding unit of the manufacturing apparatus depicted in FIG. 2.

As depicted in FIG. 2, the holding unit 60 is equipped with a plurality of arms 71 (six arms in the present embodiment) that are attached to the holding unit main body 70, with a holding plate 72 attached to the lower end (or "front end") of each arm 71 (see FIG. 3).

The holding unit main body 70 is equipped with support portions 79 (or "swinging support portions", see FIG. 3) that support the arms 71 so as to be capable of swinging and a moving unit 82 that moves the arms 71 and the holding plates 72. The holding unit main body 70 is also provided with an axis guiding member 70a that is guided to a center hole 55, described later, formed in the center of the guide member 50 and a guide hole 45 formed in the center of a convex portion 41, described later, of the loading member 40.

Each arm 71 is provided with a first arm portion 71a that extends downward from an upper end portion that is supported on a support portion 79 of the holding unit main body 70 so as to be capable of swinging and a second arm portion 71b that extends inwardly in a radial direction Ya from the upper end portion. The arms 72 have the holding plates 72 (a total of six plates in the present embodiment) attached to the lower ends of the respective first arm portions 71a.

As depicted in FIG. 5, the respective holding plates 72 are members that are curved when viewed from above, and the plurality of holding plates 72 are disposed in a state where the holding plates 72 are positioned on a circle (or curved path) that surrounds the center of the holding unit main body 70. By causing the arms 71 to swing (to open and close), the plurality of holding plates 72 are moved to a withdrawn position P1, described later, a first holding position (or "open position") P2, and a second holding position P3 (or "closed position") while maintaining a state where the holding plates 72 are positioned on the same circle C.

As depicted in FIG. 2, the holding plates 72 are each provided with a holding portion 73 that is used to hold a seal body 20.

Figure 5B:
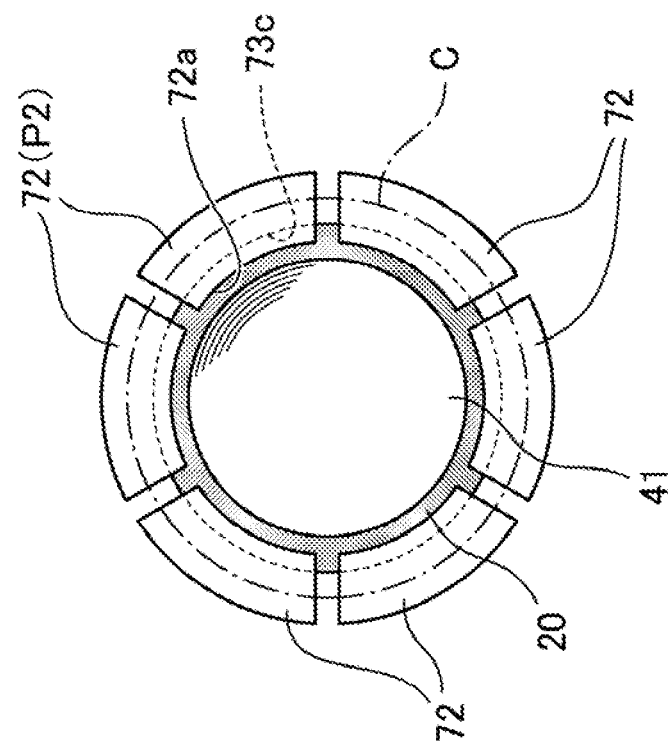
FIGS. 5A to 5B are diagrams useful in explaining the operation of the manufacturing apparatus and the method of manufacturing an assembled product.
Figure 5A:
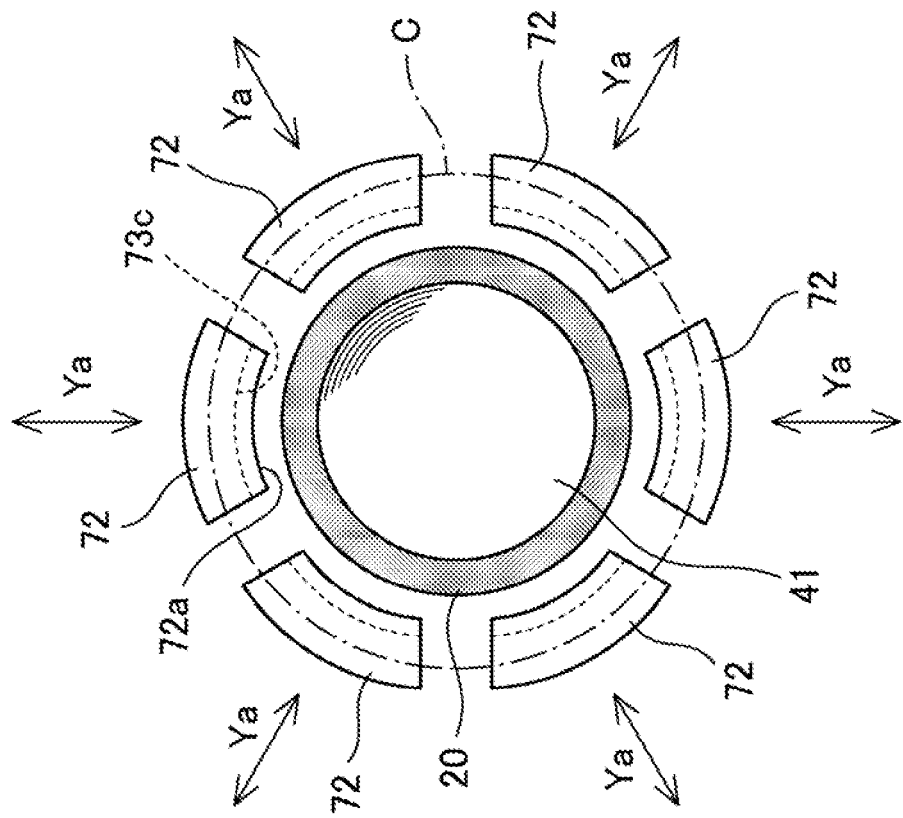

The holding portions 73 are parts that engage a ring-shaped seal body 20 when the seal body 20 is held by the plurality of holding plates 72 before attachment (see FIG. 4C). In more detail and as depicted in FIG. 4A, each holding portion 73 is provided with a pressing surface (or "first surface") 73a that faces the upper surface (or "first facing surface") of the held seal body 20, a support surface (or "second surface) 73b that faces the lower surface (or "second facing surface") of the seal body 20 in a state where the pressing surface 73a faces the upper surface 20c, and an outer facing surface 73c that the outer circumferential surface 20b of the seal body 20 faces. Accordingly, each holding portion 73 is a deep channel that is rectangular (or "U shaped") in cross section with an opening on the curved surface 72a side. Also, as depicted in FIG. 5A, the outer facing surface 73c is curved, so that each holding portion 73 is a curved channel with an opening on the curved surface 72a side that is on the inside in the radial direction Ya of the holding plates 72.

Note that the radius of curvature of the curved surface 72a on the inside in the radial direction Ya of each holding plate 72 is set by the radius of curvature of the outer circumferential surface 20b of the seal body 20 and the outer circumferential surface 10a of the component main body 10, and should preferably be the same as the radius of curvature of the outer circumferential surface 20b of the seal body 20 in an unloaded state (natural state) or larger than the radius of curvature of the outer circumferential surface 20b, and preferably be the same as the radius of curvature of a large diameter portion 53 of the guide member 50, described later, that is formed in accordance with the outer circumferential surface 10a of the component main body 10 or smaller than the radius of curvature of the large diameter portion 53. Also, although the number of holding plates 72 is six in the present embodiment, this number can be selected as appropriate.

Swinging shafts 71c (see FIG. 3) of the arms 71 extend in a tangential direction (circumferential direction) of a circle that surrounds the center of the holding unit main body 70 and the arms 71 are respectively attached to the support portions 79 so as to be capable of swinging in the radial direction Ya that extends radially from the center of the holding unit main body 70. Front end portions of the second arm portions 71b (see FIG. 2) are engaged by up-down moving portions 82b of a swinging cylinder 82a of the moving unit 82 (or "swinging mechanism") to be described next, and the first arm portions 71a are engaged by springs 82c (or "biasing members") of the moving unit 82 to be described next.

The moving unit 82 (or "holding plate moving unit" or "swinging mechanism") is equipped with a swinging cylinder 82a that swings all of the arms 71 to cause the holding plates 72 to swing and springs (or "biasing members") 82c that apply biasing forces in a direction that closes the holding plates 72.

The springs 82c are installed corresponding to the respective holding plates 72 and apply biasing forces F1 (see FIG. 2) in an inward direction of the radial direction Ya to the arms 71 that support the holding plates 72.

Note that aside from the inward biasing force of the springs 82c, gravity due to the weight of the arms 71 themselves also acts as a force that is applied to the arms 71 in the direction that closes the arms 71.

The up-down moving portions 82b of the swinging cylinder 82a engage the second arm portions 72b by contacting the upper sides of front end portions of the second arm portions 72b that extend inwardly in the radial direction Ya for the holding plates 72, and when the up-down moving portions 82b move up and down, the arms 71 and the holding plates 72 swing.

As depicted in FIG. 5A, the holding plates 72 at the lower ends of the respective first arm portions 71a are disposed at equal intervals in a state where the holding plates 72 are positioned on the circle C that surrounds the center of the holding unit main body 70.

Accordingly, when the up-down moving portions 82b move downward, the up-down moving portions 82b engage the second arm portions 71b and the second arm portions 71b swing downward, which causes the first arm portions 71a to swing outward so that the plurality of holding plates 72 are moved radially outward in the radial direction Ya (see FIGS. 4A and 5A). When the up-down moving portions 82b move upward, the engagement between the up-down moving portions 82b and the second arm portions 71b is released, the second arm portions 71b are permitted to swing upward, and the first arm portions 71a swing inward due to the inward biasing forces F1 of the springs 82c, so that the plurality of holding plates 72 swing inward in the radial direction Ya toward the center of the holding unit main body 70 (see FIGS. 4B and 4C).

As depicted in FIG. 2, the axis guiding member 70a is a rod-shaped member that extends downward in the center portion of the holding unit main body 70. The axis guiding member 70a projects downward from the lower end of the holding unit main body 70 and has a front end portion that is tapered.

By inserting the axis guiding member 70a into the center hole 55, described later, of the guide member 50, a center axis Xd of the holding unit main body 70 and a center axis Xe of the guide member 50 are aligned. Also, by inserting the axis guiding member 70a into the guide hole 45, described later, formed in the convex portion 41 of the loading member 40, the center axis Xd of the holding unit main body 70 and a center axis Xc of the loading member 40 are aligned. Accordingly, the position of the radial direction Ya is aligned between the holding unit main body 70 and the guide member 50 and the position of the radial direction Ya is aligned between the holding unit main body 70 and the loading member 40, so that it is possible to perform centering reliably in both cases, and possible to easily, quickly, and reliably supply the seal body 20 to the guide member 50, convey (remove) the seal body 20 from the loading member 40, and attach the seal body 20 to the component main body 10.

The guide member 50 is detachably mounted on the component main body 10 and is provided with an attachment portion 51 that engages the component main body 10 when the guide member 50 is mounted on the component main body 10, a guide portion 52 that is engaged by the inner circumferential portion 20a of the seal body 20, and the guide hole 55.

The attachment portion 51 is a concave part formed in a lower surface of the guide member 50 that engages an upper end portion 10b of the component main body 10. As depicted in FIG. 6C, the attachment portion 51 is provided with a radial direction positioning surface 51a that engages an outer circumferential surface of the component main body 10 and an up-down direction positioning surface 51b that is contacted by the upper end portion 10b of the component main body 10.

Accordingly, when attaching the guide member 50 to the component main body 10, the guide member 50 is placed in engagement with the component main body 10 with the radial direction positioning surface 51a of the guide member 50 contacting the outer circumferential surface 10a of the component main body 10 to regulate the position in the radial direction Ya of the guide member 50 relative to the component main body 10. That is, the guide member 50 is attached in a state where a center axis Xe of a tapered portion 54, described later, and the center axis Xb of the component main body 10 are positioned on the same axis.

At the same time, when the guide member 50 is placed in engagement with the component main body 10 with the up-down direction positioning surface 51b of the guide member 50 contacting the upper end portion 10b of the component main body 10, the position in the up-down direction X of the guide member 50 relative to the component main body 10 is regulated, so that the guide member 50 is mounted at a predetermined attachment position G1 (see FIG. 6B).

Note that the guide member 50 is formed so that when the guide member 50 has been attached at the attachment position G1 of the component main body 10, the height position of a lower end surface 53a of the large diameter portion 53 becomes the same height position (i.e., flush) with the height position of an upper surface (or "first inner wall") 11a of the attachment channel 11 (see FIG. 6C). That is, the distance in the up-down direction between the up-down direction positioning surface 51b of the guide member 50 and the lower end surface 53a of the guide member 50 is set equal to the distance between the upper end portion 10b of the component main body 10 and a plane on which the first inner wall 11a of the attachment channel 11 is located.

The guide portion 52 guides movement of a seal body 20 that is being moved toward the attachment channel 11 (i.e., to the attachment channel 11-side of the guide member 50), and is provided with the large diameter portion 53 that is positioned on the attachment channel side when the guide member 50 is attached to the component main body 10 and the tapered portion 54 that is continuous with the large diameter portion 53 and is tapered. The guide member 50 is mounted on the component main body 10 in a state where the tapered portion 54 widens in the downward direction.

The diameter of the large diameter portion 53 is slightly larger than the outer diameter of the component main body 10. The diameter of a small diameter portion 54a at the front end of the tapered portion 54 is smaller than the diameter of the inner circumferential surface 20a of the seal body 20 in the unloaded state (natural state). The diameter of the large diameter end of the tapered portion 54 is the same diameter as the large diameter portion 53 and is larger than the inner circumferential radius 20a of the seal body 20 in the unloaded state. Accordingly, when the seal body 20 is supplied from above the tapered portion 54 (see FIG. 6B) of the guide member 50 attached to the component main body 10, the seal body 20 is moved downward along the tapered portion 54 and stops at a position where the ring-shaped inner circumferential portion 20a contacts the tapered portion 54 of the guide member 50 around the entire circumference, that is, at a position (or "supplying position Q1") midway on the tapered portion 54 (see FIG. 6C).

Also, as described earlier, the lower end surface 53a of the guide member 50 attached at the predetermined attachment position G1 on the component main body 10 is flush with the upper surface 11a of the attachment channel 11 (see FIG. 6C). A gap W1 (see FIG. 6C) that is wider than a thickness Sw (see FIG. 1A) of the seal body 20 to be attached is maintained between the lower end surface 53a of the guide member 50 and the lower surface 11b of the attachment channel 11. Provided that this gap can be achieved, the height position of the lower end surface 53a of the large diameter portion 53 may be lower than the height position of the upper surface 11a of the attachment channel 11. That is, it is sufficient for the height position of the lower end surface 53a of the large diameter portion 53 and the height position of the upper surface 11a of the attachment channel 11 to be in a relationship in which the phenomenon of inverting, where the seal body 20 is attached to the attachment channel 11 with the inside and outside of the seal body 20 inverted, does not occur.

The guide hole 55 is formed in the center of the guide member 50 on the small diameter portion 54a-side so that the center of the small diameter portion 54a and the center of the large diameter portion 53 have matching axes. Accordingly, when the axis guiding member 70a of the holding unit 60 is inserted into the guide hole 55, the position in the radial direction Ya of the holding unit main body 70 relative to the guide member 50 is decided and in turn the position in the radial direction Ya of the holding unit main body 70 relative to the component main body 10 is decided. As a result, the center of the seal body 20 held by the holding unit 60 and the center of the component main body 10 are aligned in the axial direction with both bodies centered.

The loading member 40 (see FIG. 2) is a member on which a seal body 20 is loaded before attachment to a component main body 10, and includes the convex portion 41, which is disposed in the center and protrudes upward, and a loading surface 42 (see FIG. 6A), which is disposed in the periphery of the convex portion 41. The loading member 40 further includes the guide hole 45 in the center of the convex portion 41.

The convex portion 41 has a smooth surface and a swollen shape in the form of a dome (or "lens shape"). An outer circumferential edge 41a at the lower end of the convex portion 41 is circular and matches an inner circumferential edge 41a of the loading surface (loading portion) 42. That is, the inner circumferential edge 41a of the loading surface 42 is also circular. The diameter of the outer circumferential edge 41a of the lower end of the convex portion 41 (i.e., the inner circumferential edge 41a of the circular loading portion) is equal to the inner diameter of the lower end edge of the inner circumferential surface 20a of the seal body 20 to be attached. Accordingly, when the seal body 20 is loaded onto the loading member 40 so as to surround the convex portion 41 of the loading member 40, the seal body 20 becomes loaded onto the loading surface 42 positioned in a state where the lower end edge of the inner circumferential surface 20a contacts the outer circumferential edge 41a of the convex portion 41 of the loading member 40. That is, the seal body 20 is loaded onto the loading member 40 in a state where the center axis Xc of the loading member 40, described later, matches the center axis Xa of the seal body 20.

The guide hole 45 is formed so that the convex portion 41 side is open in the center of the loading member 40 and so as to have the same axis as the center of the convex portion 41 and the center of the loading surface 42. Accordingly, when the axis guiding member 70a of the holding unit 60 is inserted into the guide hole 45, the position of the holding unit main body 70 in the radial direction Ya relative to the loading member 40 is decided and in turn the position in the radial direction Ya of the holding unit main body 70 relative to the seal body 20 is decided. As a result, the center of the holding unit 60 and the center of the seal body 20 match on the same axis so that both are centered.

Next, a method of manufacturing a ring member attached product (a method of manufacturing an assembled product) will be described with reference to FIGS. 4 to 10.

Here, the method of manufacturing will be described while describing the operation of the manufacturing apparatus 1 described above.

Note that FIGS. 4A to 4C, FIGS. 6A to 6C, FIGS. 7A to 7C, and FIGS. 8A to 8B are front views (or cross-sectional views taken from the front) depicting the regions being described. FIG. 5A and FIG. 5B are plan views of the regions depicted in FIG. 4A and FIG. 4C.

This method of manufacturing an assembled product is a method that manufactures an assembled product A (see FIG. 1B) where a ring-shaped seal body 20 is attached to a ring-shaped attachment channel 11 formed in the outer circumferential surface of a cylindrical component main body 10. This method of manufacturing includes a holding step of holding a seal body 20 that has been prepared (see FIG. 4C), a supplying step of supplying the held seal body 20 to the guide member 50 that has been detachably mounted on a provided component main body 10 (see FIG. 6C), a moving step of moving the seal body 20 supplied to the guide member 50 to a position Q3 that faces the attachment channel 11 of the component main body 10 (see FIG. 7B and FIG. 9), and an attachment step that guides the seal body 20 that has moved to the facing position Q3 into the attachment channel 11 (see FIG. 7C).

Figure 10:
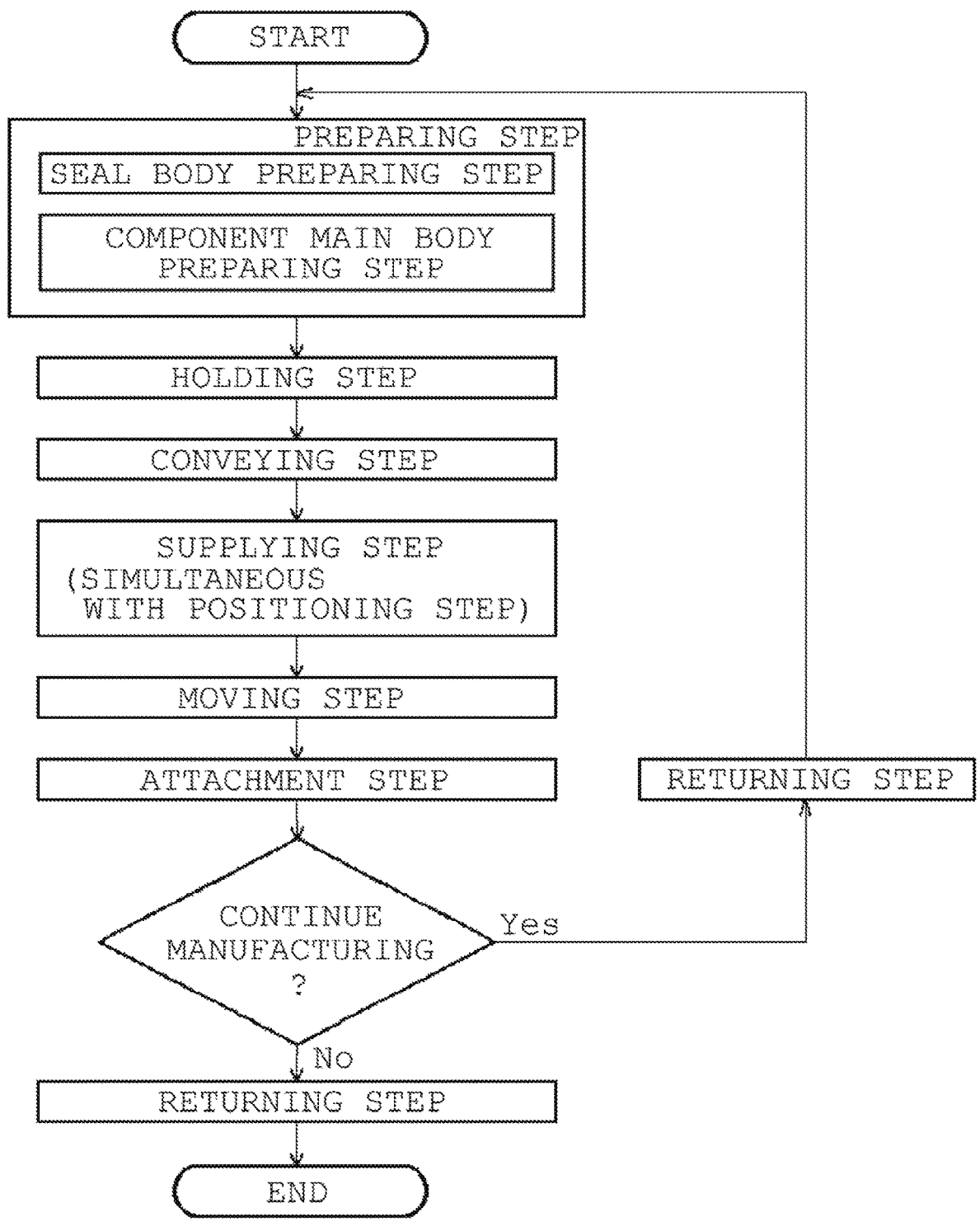
FIG. 10 is a flowchart depicting the method of manufacturing an assembled product according to the present invention.

In this method of manufacturing an assembled product, it is preferable, at the stage of preparing the assembled product A, to further include a seal body preparing step that prepares a seal body 20 (see FIG. 10) and/or a component main body preparing step that prepares the component main body 10 (see FIG. 10). It is also preferable to include a conveying step (or "moving step") that conveys the seal body 20 held on the holding unit 60 from the position of the loading member 40 to the position of the guide member 50. In a method of manufacturing where assembled products A are repeatedly manufactured, after the attachment step, it is preferable to include a returning step in order to perform the holding step where a new seal body 20 to be attached next is held (see FIG. 10).

In the seal body preparing step, as depicted in FIG. 2, the seal body 20 to be attached is carried using a carrying mechanism (not illustrated) to the loading surface 42 of the loading member 40 that has been installed as a predetermined position. Partial stretching and compression do not occur for the seal body 20 that has been carried to the loading surface 42 of the loading member 40, so that the lower end edge of the inner circumferential surface 20a will contact the outer circumferential edge 41a of the convex portion 41 of the loading member 40 (see FIG. 6A) and due to this will be reliably corrected to a round shape that is close to a perfect circle. This is a preferred state before the seal body 20 is held by the guide member 50.

After this, as depicted in FIG. 2, in the component main body preparing step, a component main body 10 before attachment of a seal body 20 is loaded onto the holding table (or "main body holding unit") 30 by a moving unit, not illustrated. A guide member is then mounted on the component main body 10 that has been loaded onto the holding table 30 by a moving mechanism, not illustrated.

Note that either of the seal body preparing step and the component main body preparing step may be performed first, or both steps may be performed simultaneously. Also, although both steps are completed before the holding step for ease of explanation in the present embodiment, it is sufficient for the seal body preparing step to be completed before the holding step and for the component main body preparing step to be completed before the supplying step.

When the seal body 20 has been prepared by the seal body preparing step, the holding step is then performed (see FIG. 4A to FIG. 4C).

When the holding step starts, the holding unit main body 70 is positioned at a raised position H1 that is the highest in the up-down direction X (see FIG. 2).

Note that although the swinging state of the arms 71 and the holding plates 72 of the holding unit main body 70 at the raised position H1 is such that engagement of the up-down moving portions 82b with the arms 71 and the holding plates 72 is released so that the arms 71 and holding plates 72 are biased by the biasing forces of the springs 82c, it is also possible for the up-down moving portions 82b to engage the arms 71 and the holding plates 72 so as to resist the biasing forces of the springs 82c.

In the holding step, the slider 91b of the horizontal moving mechanism 91 is moved in the horizontal direction to position the holding unit main body 70 above the loading member 40. The up-down moving portions 82b of the swinging cylinder 82a of the moving unit 82 are moved downward so that the up-down moving portions 82b engage the arms 71 and holding plates 72 to cause all of the arms 71 and the holding plates 72 of the holding unit main body 70 to move to a withdrawal position P1 set in advance (see the position indicated by the dot-dot-dash line in FIG. 2).

By then moving the raising/lowering portion 92a of the raising/lowering mechanism 92 downward, the axis guiding member 70a is inserted into the guide hole 55 and the position of the holding unit main body 70 in the radial direction Ya relative to the loading member 40 is decided. The holding unit main body 70 is then moved to a holding preparation height position H2 in a state where the center axis Xc of the loading member 40 and the center axis Xd of the holding unit are aligned (see FIG. 4B).

The holding plates 72 become positioned at the withdrawal position P1 that is to the outside in the radial direction Ya of the seal body 20 on the loading member 40. Accordingly, when the arms 71 are moved to the holding preparation height position H2, all of the holding plates 72 are moved to positions that surround the seal body 20 that has been loaded onto the loading member 40 but are separated from the seal body 20 (see FIG. 4B).

In this state, by moving the up-down moving portions 82b upward, due to the energizing force of the springs 82c, all of the arms 71 and the holding plates 72 swing inward in the radial direction Ya from the withdrawal position P1 to close the arms 71. As a result, the holding portions 73 of the holding plates 72 are moved to a first holding position P2 so that the outer circumferential surface 20b of the seal body 20 loaded onto the loading member 40 is held by the holding portion 73 (see FIG. 4C).

The support surfaces 73b of the respective holding plates 72 are moved to positions (the "first holding position P2") that are below and face the lower surface 20d of the seal body 20 loaded onto the loading member 40 and the pressing surfaces 73a of the respective holding plates 72 move to positions (the "first holding position P2") that are above and face the upper surface 20c of the seal body 20.

That is, by causing the holding portion 73 of every arm 71 to engage the seal body 20 (i.e., by moving the holding portions 73 to the first holding position P2), the seal body 20 is held by the holding plates 72 of the holding unit main body 70 (see FIG. 5B).

After this, by raising the holding unit main body 70 that is holding the holding unit main body 70, the seal body 20 is moved off the loading member 40 (see FIG. 6A).

The seal body 20 that has been moved off the loading member 40 by the holding unit 60 is attached the component main body 10.

Here, a conveying step that moves the seal body 20 held by the holding unit 60 toward the component main body 10 will be described first.

In the conveying step, the horizontal moving mechanism 91 is moved to move the holding unit main body 70 in the horizontal direction so that the seal body 20 held by the holding unit 60 is positioned above the holding table 30 (see FIG. 6B and FIG. 2). More specifically, the seal body 20 is positioned at a standby position above the guide member 50 mounted on the component main body 10 loaded on the holding table 30. Note that in place of movement of the holding unit 60 by the horizontal moving mechanism 91, it is also possible to move the loading member 40 and the holding table 30 using a moving mechanism, not illustrated, so that the holding table 30 is disposed at the position of the loading member 40.

Once the seal body 20 has been conveyed to a standby position above the guide member 50, the supplying step is performed next.

In the supplying step, the raising/lowering mechanism 92 is operated to move the holding unit main body 70 downward. When this happens, the seal body 20 held on the holding unit main body 70 is moved to a position that surrounds the tapered portion 54 of the guide member 50 and is inserted onto the tapered portion 54. By moving the holding unit main body 70 further downward, the seal body 20 is supplied in the state where the ring-shaped inner circumferential surface 20a has been moved to the supplying position Q1 that contacts an outer circumferential surface of the tapered portion 54 and the seal body 20 has been fitted onto the guide member 50 (see FIG. 6C).

In the method of manufacturing in the present embodiment, at the same time as the supplying step, a positioning step that matches the center axis Xa of the seal body 20 and the center axis Xb of the component main body 10 is performed. That is, in the present embodiment, by moving the holding unit main body 70 downward, the axis guiding member 70a that is provided in the center of the holding unit main body 70 is moved downward and is inserted into the guide hole 55 of the guide member 50. By doing so, positioning that produces a state (or "coaxial state") where the center axis Xb of the component main body 10 and the center axis Xa of the seal body 20 match is performed.

Once the seal body 20 has been supplied to the guide member 50, the moving step is performed next. In the moving step, the raising/lowering mechanism 92 is operated to move the holding unit main body 70 further downward. Once the holding unit main body 70 has been moved downward, the seal body 20 or the holding portions 73 of the holding unit main body 70 is/are moved along the tapered portion 54 to gradually expand the diameter of the seal body 20. In more detail, in a state where peripheral edge portions 74b of the support surfaces 73b contact the outer circumferential surface of the tapered portion 54, the holding plates 72 of the holding unit main body 70 move downward and gradually move outward (or "open up") in the radial direction (see FIG. 9).

Figure 7C:
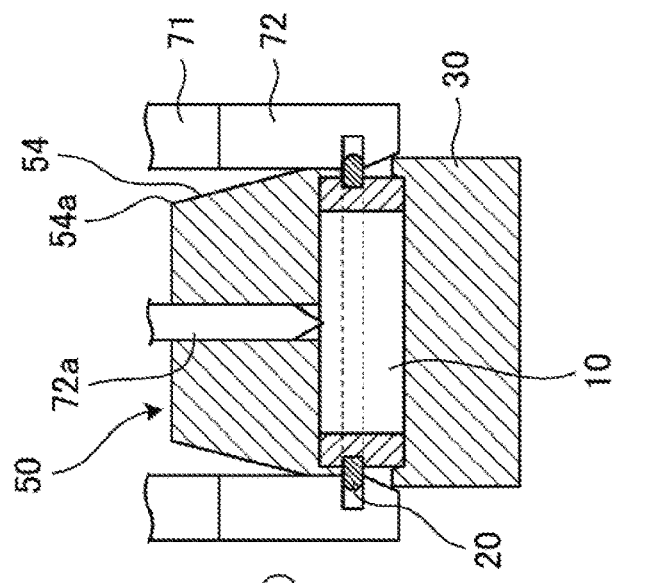
FIGS. 7A to 7C are diagrams useful in explaining the operation of the manufacturing apparatus and the method of manufacturing an assembled product.
Figure 7B:
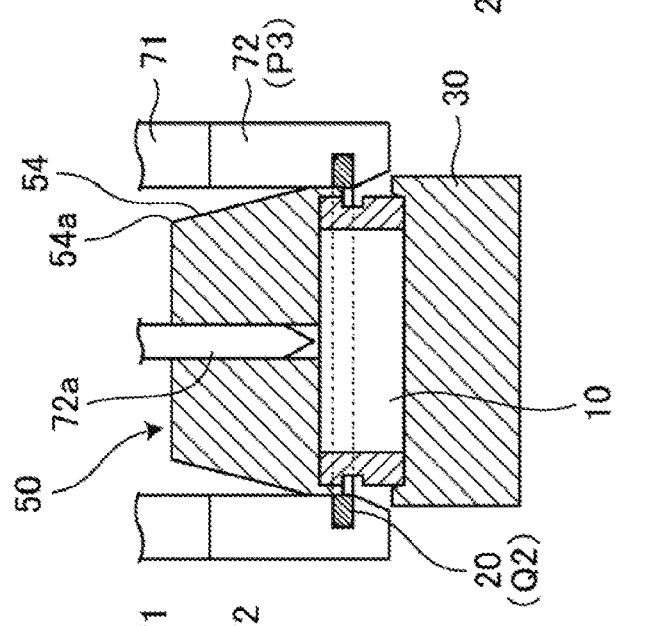
Figure 7A:
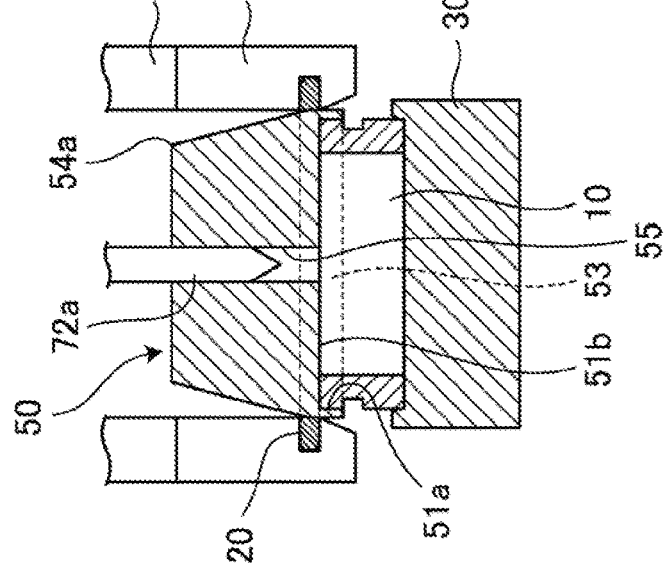

Due to the holding unit main body 70 moving downward, the seal body 20 is moved from the supplying position Q1 downward toward the attachment channel 11 of the component main body 10 in keeping with the downward movement of the holding unit main body 70 and with the pressing surfaces 73a of the holding portions 73 of the holding plates 72 contacting the upper surface 20c of the seal body 20 (see FIG. 7A).

The seal body 20 that has moved to the large diameter portion 53 that is below and continuous with the tapered portion 54 is moved to a first movement position (or "large diameter position") Q2 in a state where the seal body 20 has deformed to a larger diameter (see FIG. 7B).

The diameter of the large diameter portion 53 is larger than the diameter of the ring-shaped outer circumferential surface 10a of the component main body 10 in which the attachment channel 11 is formed. Accordingly, the seal body 20 that has been moved to the large diameter portion 53 while being held by the holding portions 73 of the holding unit main body 70 and has deformed to a larger diameter will have deformed so that the diameter of the ring-shaped inner circumferential surface 20a is larger than the diameter of the ring-shaped outer circumferential surface 10a of the component main body 10.

As depicted in FIG. 7B, due to the further downward movement of the holding unit main body 70 that maintains the state of holding the seal body 20, the seal body 20 that has moved to the first movement position Q2 is pressed further downward by the pressing surfaces 73a of the holding portions 73 and is thereby moved downward from the first movement position Q2. After this, as depicted in FIG. 7C, the seal body 20 is moved to a position Q3 that faces the ring-shaped attachment channel 11 formed in the ring-shaped outer circumferential surface 10a of the component main body 10.

Figure 9:
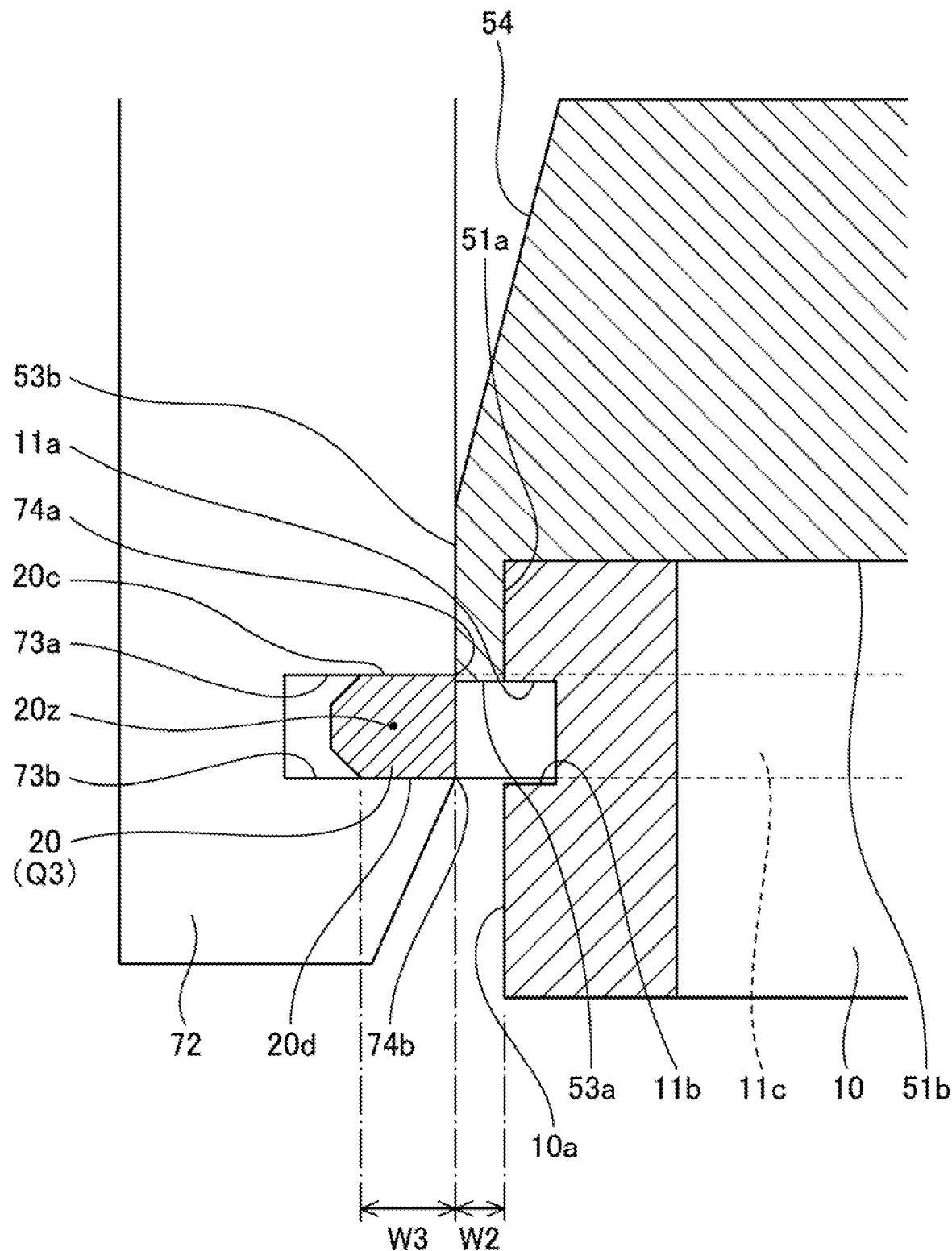
FIG. 9 is an enlarged diagram useful in explaining an operation from a state in FIG. 7B to a state in FIG. 7C.

The expression "facing position Q3" referred to here is a position disposed on the outside of the attachment channel 11 in the radial direction so that the seal body 20 that has deformed to a larger diameter than the cylindrical outer circumferential surface 10a of the cylindrical component main body 10 surrounds the attachment channel 11 of the component main body 10 (see FIG. 9).

Peripheral portions 74a of the pressing surfaces 73a of the holding plates 72 contact an outer circumferential surface 53b of the large diameter portion 53 of the guide member 50 (see FIG. 7B).

That is, the holding plates 72 of the holding unit main body 70 are positioned at the first holding position P2 where the peripheral edge portions 74b of the support surfaces 73b contact the outer circumferential surface of the tapered portion 54 when the seal body 20 has been supplied to the supplying position Q1 (see FIG. 6C) and peripheral edge portions 74a of the pressing surface 73a contact the outer circumferential surface of the tapered portion 54 when the seal body 20 has moved to the facing position Q3 (see FIG. 7B).

Note that the arms 71 and the holding plates 72 should preferably be configured so that when positioned at a second holding position P3, the pressing surfaces 73a are parallel with the upper surface 20c of the seal body 20.

In the attachment step that follows the moving step, the seal body 20 that deformed to an expanded diameter returns (shrinks) from the expanded state to the original state so that the seal body 20 is attached to the attachment channel 11. When the seal body 20 returns to the original state during attachment, movement in the up-down direction is restricted (guided) to ensure that the seal body 20 is reliably attached to the attachment channel 11 (see FIG. 9).

In more detail, movement in the up-down direction of the ring-shaped seal body 20 that deforms so that its diameter reduces from the expanded diameter back to the original state is restricted by the support surfaces 73b and the pressing surfaces 73a of the holding portions 73 of the holding plates 72 restricting the upper surface 20c and the lower surface 20d of the seal body 20.

As depicted in FIG. 7C, in the attachment step, the pressing surfaces 73a of the holding plates 72 of the holding unit 60 ultimately match the height position of the upper surface 11a of the attachment channel 11 and the support surfaces 73b match the height position of the lower surface 11b of the attachment channel 11. Also, as depicted in FIG. 9, the peripheral edge portions 74a on the inside of the pressing surfaces 73a in the radial direction come into contact with the outer circumferential surface 53b of the large diameter portion 53. The peripheral edge portions 74b on the inside of the support surfaces 73b in the radial direction are flush with the outer circumferential surface 53b of the large diameter portion 53 and are positioned the distance W2 from the outer circumferential surface 10a of the component main body 10. The size of this distance W2 should preferably be adjusted so that the distance W2 is shorter than the width W3 in the radial direction of the seal body 20. By doing so, there is no risk of improper attachment of the seal body 20 to the attachment channel 11 when the seal body 20 returns to its original shape.

The pressing surfaces 73a and the support surfaces 73b of the holding plates 72 disposed in this way enable the diameter of the seal body 20 to reduce while the seal body 20 is kept in a held state. Accordingly, the seal body 20 deforms while being kept in a held state by the holding portion 73.

On the other hand, the pressing surfaces 73a and the support surfaces 73b of the holding plates 72 disposed in this way face each other while being adjacent to the upper surface 20c and the lower surface 20d of the seal body 20, so that rotation of the seal body 20 about a ring-shaped axis 20x that extends in the circumferential direction of the seal body 20 is reliably restricted.

That is, in a state where the held state is maintained by the pressing surfaces 73a and the support surfaces 73b, the seal body 20 is guided toward the attachment channel 11 and the component main body 10 and deforms so that its diameter reduces to become attached to the attachment channel 11 with the same orientation as the held state (see FIG. 7C).

In this way, the pressing surfaces 73a and the support surfaces 73b of the holding portion 73 function as a guide for movement that causes the diameter of the seal body 20 to reduce when the seal body 20 is attached, so that the assembled product A is manufactured by reliably moving and attaching the seal body 20 to the attachment channel 11.

Figure 8A:
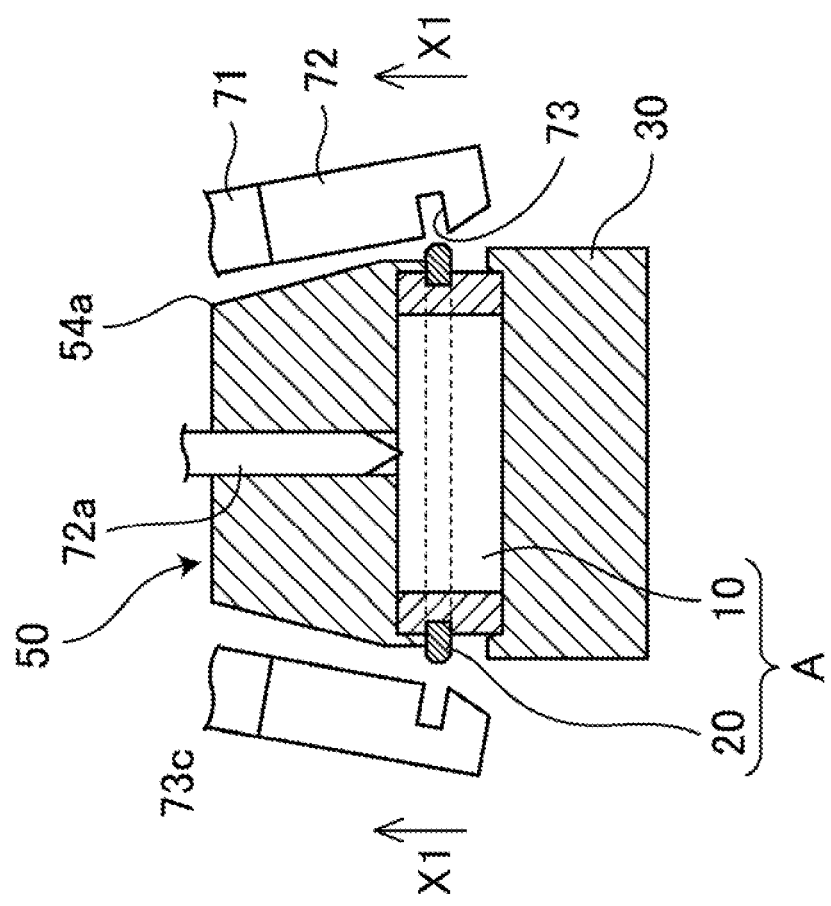
FIGS. 8A and 8B are diagrams useful in explaining the operation of the manufacturing apparatus and the method of manufacturing an assembled product.
Figure 8B:
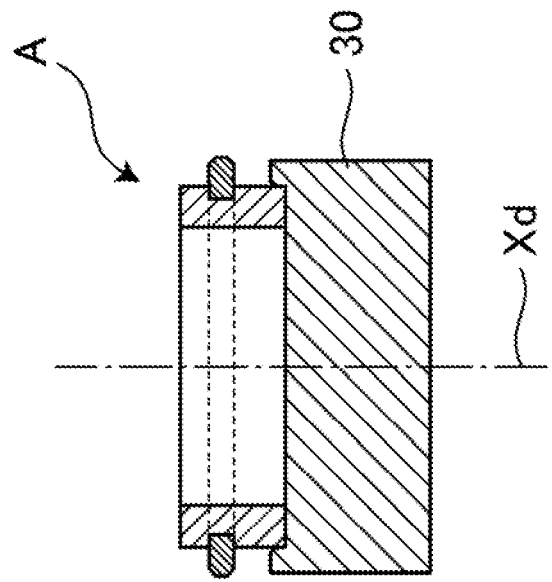

When the seal body 20 has been attached to the component main body 10, the swinging cylinder 82a is operated to move the up-down moving portions 82b downward and cause the arms 71 and the holding plates 72 of the holding unit main body 70 to move outward in the radial direction (see FIG. 8A). After this, the raising/lowering mechanism 92 is operated to cause the holding unit main body 70 to move in the upward direction X1. Next, the guide member 50 attached to the component main body 10 is moved by a moving mechanism, not illustrated, to release the attachment of the guide member 50 to the component main body 10. After this, by removing the component main body 10 from the holding table 30 using a moving mechanism, not illustrated, the assembled product A is obtained.

When manufacturing of assembled products A is to be repeatedly performed, after a manufactured assembled product A has been removed, the horizontal moving mechanism 91 and the raising/lowering mechanism 92 of the conveying mechanism 90 are operated to cause the holding unit main body 70 to move to a position above the loading member 40 (the returning step). At the same time, the seal body preparing step and the component main body preparing step described above are performed.

After this, by repeatedly executing the series of steps from the holding step described earlier, it is possible to consecutively manufacture assembled products A.

What is claimed is:

1. A method of manufacturing an assembled product that has a ring-shaped seal body attached to a ring-shaped attachment channel formed in an outer circumferential surface of a component main body, the method comprising:

a supplying step that supplies the seal body to a guide member that has been detachably mounted on the component main body;

a moving step that moves the seal body from a supplying position on the guide member to a facing position that faces the attachment channel; and an attachment step that guides the seal member that has moved to the facing position into the attachment channel, wherein the ring-shaped seal body is capable of elastic deformation and is provided with a ring-shaped inner circumferential portion, a first facing surface that faces a first inner wall out of a pair of inner walls of the attachment channel when the seal body is attached to the attachment channel, and a second facing surface that faces a second inner wall out of the pair of inner walls, the guide member includes a large diameter portion, which is positioned on an attachment channel side when the guide member is mounted on the component main body, and a tapered portion, which is continuous with the large diameter portion and narrows, and the guide member is positioned so that an axis of the tapered portion matches an axis of the component main body, the supplying step fits the ring-shaped inner circumferential portion of the ring-shaped seal body onto the tapered portion of the guide member, the moving step moves the seal body toward the attachment channel with the inner circumferential portion of the seal body in contact with the tapered portion to expand an inner diameter of the ring-shaped inner circumferential portion to an outer diameter of the outer circumferential surface or larger, and when the ring-shaped seal body at the facing position is attached to the attachment channel, the attachment step guides attachment to the attachment channel while guiding the ring-shaped seal body that deforms from an expanded state to a reduced diameter due to elastic deformation, wherein the moving step holds at least part of a circumferential end surface and a circumferential edge portion of the seal body supplied to the tapered portion using a holding unit, and expands the inner diameter of the seal body held by the holding unit by moving the seal body along the tapered portion toward the attachment channel in a state where holding of the seal body is maintained, and the attachment step moves the seal body from a position contacting the large diameter portion to the facing position in a state where the holding of the seal body by the holding unit is maintained and, when a pressing force that acts outwardly in a radial direction of the seal body due to the large diameter portion is released so that the inner diameter of the seal body reduces due to elastic deformation, guides the seal body into the attachment channel in a state where the holding of the seal body by the holding unit is maintained, wherein the holding unit is equipped with a plurality of holding plates equipped with holding portions that hold the circumferential end surface and the circumferential edge portion of the seal body by a first surface that faces the first facing surface of the held seal body, a second surface that faces the second facing surface of the seal body, and an outer facing surface that faces an outer circumferential surface of the seal body.

2. A method of manufacturing an assembled product according to claim 1,
wherein the supplying step includes a positioning step that aligns positions of a center of the component main body and a center position of the seal body.

3. A method of manufacturing an assembled product according to claim 1,
wherein
each holding plate is capable of moving outward and inward in a radial direction of the seal body and is also capable of moving toward an axis of the tapered portion, and
the attachment step attaches the seal body, which has been moved in the moving step while the diameter expands and the seal body is guided by the guide portion, to the attachment channel.

4. A method of manufacturing an assembled product according to claim 3,
wherein each holding plate is capable of moving to a holding position where the seal body is held by the holding portion and to a withdrawal position where the holding plate has been moved outward from the holding position in the radial direction of the seal body and is separated from the seal body, and the method of manufacturing further comprises a conveying step that moves the plurality of holding plates from the withdrawal positions to the holding positions to hold the ring-shaped seal body, which is to be attached and has been moved to a predetermined position, using the plurality of holding plates in a conveyable state, and conveys the held seal body to a standby position above the tapered portion.

* * * * *